No. 807,503. PATENTED DEC. 19, 1905.
A. SCHWARZ.
PROCESS OF CONCENTRATING ORES.
APPLICATION FILED MAY 27, 1904.
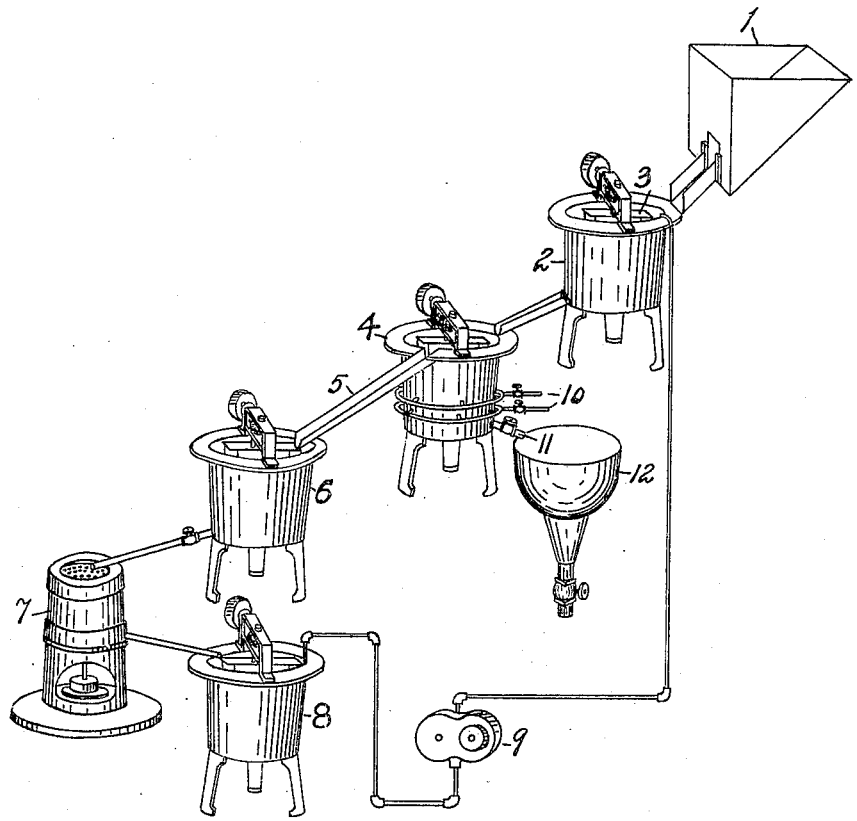
WITNESSES:
Grace D. Heasley.
Harry Schnage.
INVENTOR
Alfred Schwarz
BY
Charles D. Jones.
His ATTORNEY

UNITED STATES PATENT OFFICE.

ALFRED SCHWARZ, OF NEW YORK, N. Y., ASSIGNOR TO THE SCHWARZ ORE TREATING COMPANY, OF PHŒNIX, ARIZONA TERRITORY, A CORPORATION OF ARIZONA TERRITORY.

PROCESS OF CONCENTRATING ORES.

No. 807,503. Specification of Letters Patent. Patented Dec. 19, 1905.

Application filed May 27, 1904. Serial No. 210,138.

*To all whom it may concern:*

Be it known that I, ALFRED SCHWARZ, a subject of the German Emperor, and a resident of the borough of Manhattan, city, county, and State of New York, have invented certain new and useful Improvements in Processes of Concentrating Ores, of which the following is a specification.

My invention has for its object the concentration of ores by the selective action of a hydrocarbon compound.

Heretofore the separation of the values in ores has been effected by mixing the pulverized ore with a product resulting from the distillation of petroleum, the ore having been previously mixed with sufficient water to form a freely-flowing pulp. The oil in such method exercises the property of attaching itself to and buoying up the metallic constituents of the ore that are suspended in the pulp; but it has little or no effect upon the earthy constituents. I have found that the efficiency of the selective action of oils generally, either mineral, vegetable, or animal, is increased by the addition thereto of a fatty matter which is solid at normal temperatures, as paraffin, stearin, or palmitin.

In carrying out my invention I proceed as follows: The ore is first crushed and screened to a convenient size for working and is then thoroughly and intimately mixed with the selective material, which in this instance is a compound of a mineral, vegetable, or animal oil and a fatty matter of the character above specified, such mixture being solid at normal temperatures. Such material may be readily prepared by dissolving the fatty matter in the oil medium, heat being employed to melt the fatty matter, if necessary, and to maintain the compound in a liquid condition during its incorporation with the pulverized ore. As a specific example of a selective material I prefer crude petroleum or any of its products, to which is added about nine to ten per cent., by weight, of paraffin, such proportion having been found to give good results with a copper-sulfid ore.

Any suitable apparatus may be employed to effect the mixture of the ore and selective material, all that is essential being a vessel provided with agitating-blades. In such vessel the ore is mixed with sufficient of the selective material to make a thick pasty mass, the agitation being continued long enough to bring the selective material into intimate contact with all portions of the ore. The vessel may be steam-jacketed or otherwise suitably heated if found necessary to maintain the selective material in a liquid condition. After a complete incorporation of the selective material with the ore water, preferably under pressure, is injected into the mass by suitably-arranged pipes and agitation continued until the water is distributed throughout the mass. The mass is then allowed to subside, when the selective material, with the entrapped metallic constituents of the ore, will rise to the top and may be removed in any suitable manner, as by floating over the top of the vessel. The values may be separated from the selective material in any suitable or well-known manner—as, for example, by a centrifugal drum or filter-press. The tailings, being unaffected by the selective material, will remain in the water and settle to the bottom of the vessel, from which they may be drawn off and, if necessary, subjected to further treatment for the recovery of any values they may contain.

In the concentration of ores by the selective action of the compound above described the action is facilitated and better results secured by the injection of a gaseous fluid—such as air, steam, or gas as carbon-dioxid gas—into the mass. This may be done by suitably-arranged pipes leading into the bottom or sides of the vessel, the effect of such use of air, steam, or gas being to break up and subdivide the mass in a complete and thorough manner. Furthermore, it results in the selective material taking up an appreciable quantity of air or gas, giving a certain amount of sponginess, which increases its floating power. After the admission of water, which may be done by suitably-arranged pipes, the admission of air, steam, or gas may be continued to assist in distributing the water throughout the mass and to effect a thorough separation and washing out of the tailings.

In referring to paraffin as a "fatty matter" it is to be understood that I do so in a popular and not a chemical sense. It is also to be understood that the proportions of the ingredients of the selective material may be varied to suit the particular ore treated.

The accompanying drawing shows in perspective one arrangement of apparatus by which the process may be carried out.

1 designates a bin or hopper from which the pulverized ore is discharged into a vessel 2, which is preferably steam-jacketed and provided with an agitator 3. In this vessel the ore and selective agent are intimately mixed, and from said vessel the mass is discharged into a vessel 4, provided with an agitator in which it is treated with water slightly acidulated, if desired, to effect the separation of the selective agent, with the entrapped metallic constituents, from the tailings. If cold water is employed, the selective agent will be solidified and rising to the top is conducted by a trough 5 to a remelting and storage vessel 6. If heated or boiling water is employed in the vessel 4, the selective agent will be maintained in its liquid condition and as it rises with the entrapped metallic constitutents is run by the trough 5 into the storage vessel 6 and from the latter to a centrifugal-drum 7 for the separation of the values from said agent. The recovered agent is collected in a storage vessel 8, from which it may be raised to the mixing vessel 2 by a pump 9. The separating vessel 4 is provided with suitable pipes 10 for the admission of air, steam, or gas and with a pipe 11 by which the tailings may be discharged into a vessel 12. After removal of the values from the separator 7 they may be subjected to any suitable treatment.

What I claim, and desire to secure by Letters Patent, is—

1. The process of concentrating ores consisting in mixing with the pulverized ore a selective agent consisting of a mixture of a liquid hydrocarbon and a normally solid fatty matter which mixture is solid at normal temperatures, separating said agent with its entrapped values from the tailings, and finally recovering the values from the selective agent.

2. The process of concentrating ores consisting in mixing with the pulverized ore a selective agent consisting of a mixture of a liquid hydrocarbon and a normally solid fatty matter which mixture is solid at normal temperatures, treating the mass with water to separate said agent with its entrapped values from the tailings, and finally recovering the values from the selective agent.

3. The process of concentrating ores consisting in mixing with the pulverized ore a selective agent consisting of a mixture of a liquid hydrocarbon and a normally solid fatty matter which mixture is solid at normal temperatures, treating the mass with cold water to separate said agent with its entrapped values from the tailings, and finally recovering the values from the selective agent.

4. The method of concentrating ores consisting in mixing with the pulverized ore a selective agent consisting of a mixture of a liquid hydrocarbon and a normally solid fatty matter which mixture is solid at normal temperatures and subjecting the mass to the action of a gaseous fluid, separating the selective agent with its entrapped values from the tailings, and finally recovering the values from the selective agent.

5. The process of concentrating ores consisting in mixing with the pulverized ore a selective agent consisting of a mixture of a liquid hydrocarbon and paraffin which mixture is solid at normal temperatures, separating said agent with its entrapped values from the tailings, and finally recovering the values from the selective agent.

6. The process of concentrating ores consisting in mixing with the pulverized ore a selective agent consisting of a mixture of a liquid hydrocarbon and paraffin which mixture is solid at normal temperatures, treating the mass with water to separate said agent with its entrapped values from the tailings, and finally recovering the values from the selective agent.

In testimony whereof I have hereunto signed my name in the presence of two subscribing witnesses.

ALFRED SCHWARZ.

Witnesses:
E. F. PORTER,
CHARLES S. JONES.